US006282336B1

(12) United States Patent
Riza

(10) Patent No.: US 6,282,336 B1
(45) Date of Patent: Aug. 28, 2001

(54) HIGH SPEED FIBER-OPTIC SWITCH

(75) Inventor: Nabeel Agha Riza, Orlando, FL (US)

(73) Assignee: Light Bytes, Inc., Orlando, FL (US)

( * ) Notice: Subject to any disclaimer, the term of this patent is extended or adjusted under 35 U.S.C. 154(b) by 0 days.

(21) Appl. No.: 09/405,487

(22) Filed: Sep. 24, 1999

(51) Int. Cl.[7] .............................. G02B 6/26; G02F 1/335
(52) U.S. Cl. ................................... 385/21; 385/7
(58) Field of Search ................... 385/20, 21, 17, 385/18, 7, 36

(56) References Cited

U.S. PATENT DOCUMENTS 5,450,224 * 9/1995 Johansson ............................. 359/128
6,134,358 * 10/2000 Wu et al. ................................ 385/16

OTHER PUBLICATIONS

W.E. Stephens, P.C. Huang, T.C. Banwell, L.A. Reith, S.S. Cheng, Demonstration of a photonic space switch utilizing acousto–optic elements, Optical Engineering, Mar. 1990, Vo. 29, No. 3, pp. 183–190.*

Dan O. Harris, A. Vanderlugt, Acousto–optic photonic switch, Optics Letters, Nov. 1, 1989, vol. 14, No. 21, pp. 1177–1179.*

Dan O. Harris, Multichannel acousto–optic crossbar switch, Applied Optics, Oct. 10, 1991, Vo. 30, No. 29, pp. 4245–4256.*

Dan O. Harris, A. Vanderlugt, Multichannel acousto–optic crossbar switch with arbitrary signal fan–out, applied Optics, vol. 31, No. 11, Apr. 10, 1992, pp. 1684–1686.*

Eero Tervonen, Ari Friberg, Jan Westerholm, Jari Turunen, Mohammad Taghizadeh, Programmable optical interconnections by multilevel synthetic acousto–optic holograms, Optics Letters, vol. 16, No. 16, Aug. 15, 1991, pp. 1274–1276.*

M.L. Wilson, D.L. Fleming, F.R. Dropps, A Fiber Optic Matrix Switchboard Using Acousto Optic Bragg Cells, SPIE, vol. 988, (1988) pp. 56–62.*

Norman J. Berg, John M. Pellegrino, Acousto–optic Signal Processing, Theory And Implementation, Copyright 1996 by Marcel Dekker, Inc.pp. 479–492.*

Nabeel A. Riza, In–line interferometric time–integrating acousto–optic correlator, Applied Optics, vol. 33, No. 14, May 10, 1994, pp. 3060–3069.*

Nabeel A. Riza, Acousto–optic device–based high–speed high–isolation photonic switching fabric for signal processing, Optics Letters, Jul. 1, 1997, vol. 22, No. 13, pp. 1003–1005.*

Nabeel A. Riza, Jian Chen, Ultrahigh–47–dB optical drop rejeciton multiwavelength add–drop filter using spatial filtering and dual bulk acousto–optic tunable filters, Optics Lettes, Jun. 15, 1998, vol. 23, No. 12, pp. 945–947.*

* cited by examiner

*Primary Examiner*—Jordan M. Schwartz
(74) *Attorney, Agent, or Firm*—James H. Beusse

(57) ABSTRACT

A 2×2 fiber-optic (FO) switch using electronically controlled light beam deflectors such as acousto-optic deflectors is described. The switch structure can be modified to serve as variable FO attenuators and frequency shifters. The basic no moving parts FO switch/attenuator structure can be used for routing and controlling multiple light signals in optical networks such as wavelength division multiplexed (WDM) optical communications, distributed sensor networks, and photonic signal processing systems requiring optical routing and gain control.

20 Claims, 2 Drawing Sheets

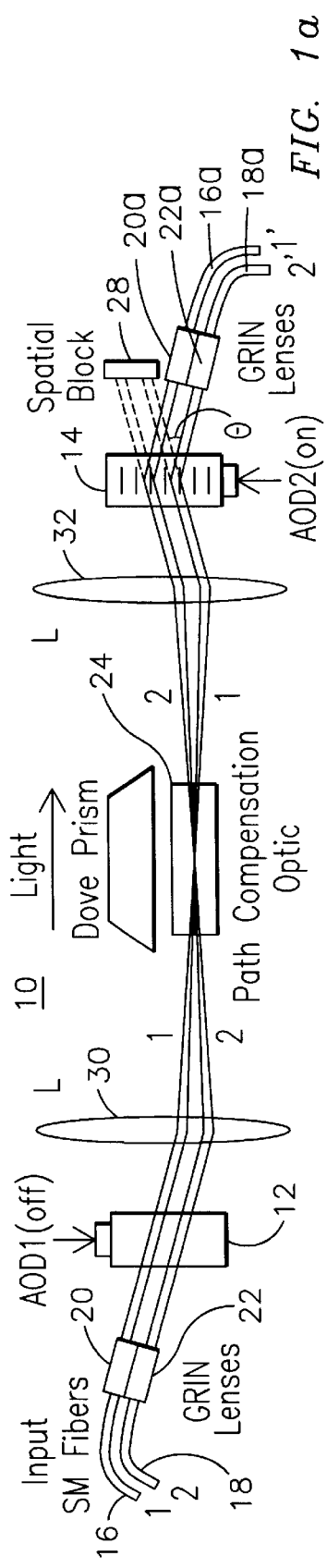
FIG. 1a
FIG. 1b
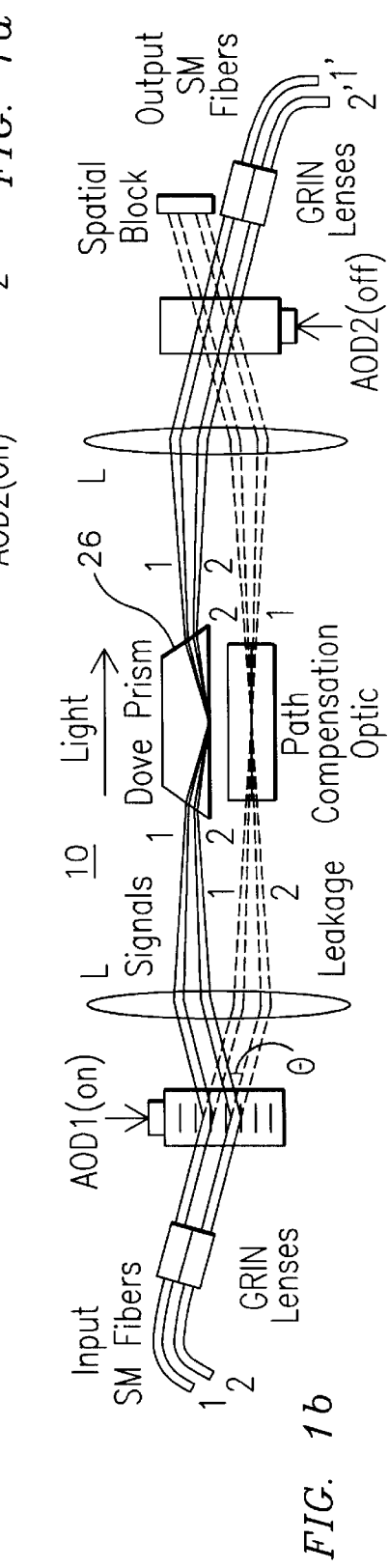
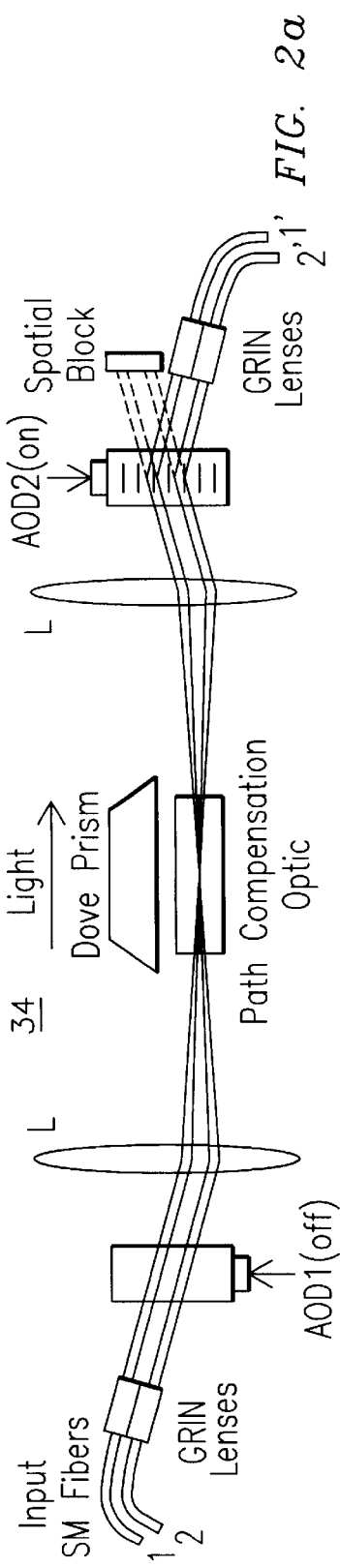
FIG. 2a

HIGH SPEED FIBER-OPTIC SWITCH

FIELD OF INVENTION

In this invention, a 2×2 fiber-optic (FO) switch using electronically controlled light beam deflectors such as acousto-optic deflectors is described. The switch structure can be modified to serve as variable FO attenuators and frequency shifters. The basic no moving parts FO switch/attenuator structure can be used for routing and controlling multiple light signals in optical networks such as wavelength division multiplexed (WDM) optical communications, distributed sensor networks, and photonic signal processing systems requiring optical routing and gain control. The high speed, high isolation 2×2 optical switch and attenuator, with the additional capability of handling high optical powers, can be used in optical switching instrumentation for: (a) telecommunication optical fiber line protection manufacturers, (b) fiber-optic line remote sensing and testing manufacturers using optical time domain reflectometers, (d) optoelectronic component manufacturing and test factories, and (e) distributed environmental optical sensor manufacturers for chemical, temperature, and pressure detection.

BACKGROUND OF INVENTION

The fiber-optic (FO) switch is a basic building block for many optical applications such as routing in fiber communications networks, photonic signal processing, distributed optical sensing, and optical controls. The desired features for a FO switch include low optical loss (e.g., <1 dB), low interchannel crosstalk (<−30 dB), polarization independence, robustness to catastrophic failure, and simple to align low cost designs for large scale commercial production and deployment. Depending on the application, FO switching speeds can range from nanoseconds to several milliseconds. Fast sub-microseconds (e.g., 100 ns) switching speeds are required in internet type packet switched FO networks.

Similarly, variable fiber-optic attenuators are the basic building blocks for several key optical systems. Presently, these attenuators are required as equalizers in wavelength division multiplexed (WDM) optical communication systems using non-uniform gain optical amplifiers. Other important applications include polarization dependent loss compensation in fiber optic networks, optical component testing, and optical receiver protection. Hence, a variable fiber-optic attenuator with fast sub-microseconds duration speed with exceptionally high attenuation dynamic range (e.g., 50 dB) control is a present challenge to the optical community.

Over the years, attempts have been made to realize acoustooptic (AO) FO switches as AO technology has speeds in the submicrosecond regime. These include works such as W. E. Stephens, P. C. Huang, T. C. Banwell, L .A. Reith, and S. S. Cheng, "Demonstration of a photonic space switch utilizing acousto-optic elements," *Opt. Eng.* 29 (3):183–190, 1990, D. O. Harris and A. Vanderlugt, "Acousto-optic photonic switch," *Opt. Lett.* 14 (21): 1177–1179, 1989, D. O. Harris, "Multichannel acousto-optic crossbar switch," *Appl. Optics* 30, 4245–4256, Oct. 10, 1991, D. O. Harris and A. Vanderlugt, "Multichannel acousto-optic crossbar switch with arbitrary signal fan-out," *Appl. Optics* 32, pp. 1684–1686, April 1992, E. Tervonen, A. T. Friberg, J. Westerholm, J. Turunen, and M. R. Taghizadeh, "Programmable optical interconnections by multilevel synthetic acousto-optic holograms," *Opt. Lett.* 16:1274–1276, 1991, M. L. Wilson, D. L. Fleming, and F. R. Dropps, "A fiber optic matrix switchboard using acoustooptic bragg cells," *SPIE* 988, 56–62, 1988, and K. Wagner, R. T. Weverka, A. Mickelson, K. Wu, C. Garvin, and R. Roth, Chapter 14, Low-loss acousto-optic photonic switch," pp.479–492, in Acousto-optic Signal Processing, Editors N. J. Berg and J. M. Pellegrino, $2^{nd}$ Edition, Marcel Dekker, 1996. All these switches have been unable to realize the goal for high >50 dB isolation optical switching. Moreover, some approaches require lossy passive N:1 beam combiners, others require multichannel AO devices with limited crosstalk levels, and some even require multimode output fibers that limit signal modulation bandwidths and are incompatible with single mode telecommunication fibers. In addition to making larger N×N switches, these prior art design switches do not scale well as, for instance, there is a limit (e.g., 64) to the number of channels presently possible in a multichannel AO device. This type of design also requires N drive frequencies that are different, making the drive hardware complex, costly, and hard to control as the switch scale grows. If a Fourier optics type design is used, there are limitations to the number of spots the system can resolve in the output fiber plane, and the lens focal length and size can become big in order to reduce interchannel spatial crosstalk.

Specifically, because AO devices work on the principle of diffraction to implement 1 to N beam deflection, even a high 99% diffraction leads to a 1% leakage light in the non-switched port, implying a near 100:1 or 20 dB switch isolation. In this case, a single AO device serves to form a minimum 1×2 FO switch where N=2. Thus, so far it has not been possible to form a very high optical isolation (e.g., >50 dB) switch using diffraction-based devices like AO devices even for the simple 1×2 switch configuration. The 2×2 switch is the highly sought after FO switch as many 2×2 switches can be combined to form large N×N switch matrices. It is also highly desirable to form high dynamic range (e.g., 50 dB) and high resolution (0.1 dB) FO attenuators working at high sub-microsecond domain speeds.

SUMMARY OF THE INVENTION

The present invention is directed to a resolution of the above described prior art deficiencies by providing both high speed FO 2×2 switches and FO attenuators with high isolation and dynamic ranges using beam deflection devices such as acousto-optics. Earlier, as shown in N. A. Riza, "Acousto-optic device-based high-speed high-isolation photonic switching fabric for signal processing," *Optics Letters*, Vol. 22, No. 13, July 1997 and N. A. Riza and J. Chen, "Ultrahigh—47-dB optical drop rejection multiwavelength add-drop filter using spatial filtering and dual bulk acousto-optic tunable filters," *Optics Letters*, Vol. 23, No. 12, June 1998, it is possible to realize a high isolation 1×2 switching configuration by using two AO devices in a cascade with the AO devices operating in an orthogonal drive setting. In other words, only one AO device is driven at any instant. These were 1×2 switch structures and not the highly desired 2×2 structures. In the present invention, this 1×2 structure is modified in a unique way using an image inversion concept to realize the 2×2 switch. For example, a Dove prism is used as the image inversion device to realize the invention. Previously, the Dove prism has been deployed in AO signal processing systems such as in N. A. Riza, "In-line interferometric time integrating acoustooptic correlator," *Applied Optics*, Vol. 33, No. 14, pp. 3060–3069, May 10, 1994.

This inventive 2×2 FO switch structure is based on an image inversion scheme coupled with orthogonal drive beam deflection devices such as AO devices. The unique spatial filtering techniques inherent in the switch design make it a high isolation structure that can also form FO attenuators and frequency shifters. The structure is reversible with analog optical gain control and fine beam alignment controls. High power optical beams can also be used in the bulk crystal-based deflector units deployed to make the switch/attenuator modules.

BRIEF DESCRIPTION OF THE DRAWINGS

FIGS. 1a and 1b illustrate a 2×2 optical switch in one form of the present invention in exchange and non-exchange states, respectively;

FIGS. 2a and 2b illustrate another form of the inventive 2×2 optical switch in exchange and non-exchange states, respectively.

DETAILED DESCRIPTION OF THE INVENTION

Figure 2B:
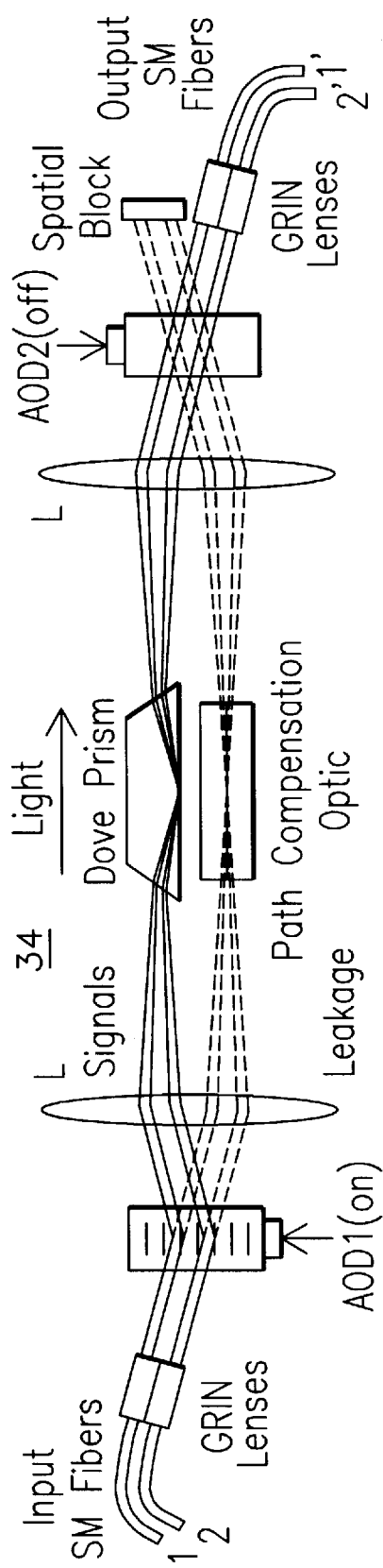

A novel 2×2 optical switch 10 based on the concept of "Image Inversion" and acousto-optic deflectors (AODs) 12, 14 is depicted in FIG. 1. The AODs 12, 14 operate in the high-diffraction-efficiency Bragg mode, and at any instant only one of the AODs is driven or "on". This is important because when the two AODs 12, 14 operate in orthogonal states, i.e., one is "on" and the other is "off", any leakage noise can be suppressed by spatially separating the signal and the leakage noise beams. This technique, called the "orthogonal drive configurations" is used for obtaining high noise-suppression switching fabrics. While the invention is described in conjunction with the use of acousto-optic deflectors, it will be recognized that other optical beam deflector technologies such as bulk and integrated electro-optics, magneto-optic, and micro-electromechanical systems (MEMS)-based devices, such as, for example, electro-optic ceramics, electro-optic liquid crystals, MEMS-type electrostatic or magnetically actuated micromirror design gratings, and surface acoustic-wave (SAW) devices, could be used in the switch and attenuator design.

Light is launched into the switch 10 from single-mode (SM) optical fibers 16, 18 via a pair of gradient index (GRIN) fiber-optic (FO) collimators 20, 22. Both beams can follow two different paths in the switching fabric. These are the straight (or non-exchanging) state (e.g., 1→1' and 2→2') and the exchanging state (e.g., 1→2' and 2→1'), where 1, 2 are the input ports of the switch, and 1', 2' are the output port of the switch. When the AOD 12 is driven by a radio frequency (RF) signal of the appropriate amplitude and frequency, the optical signal impinging onto the AOD 12 is diffracted by an angle θ relative to the incident beam. Making use of this spatial separation between the two diffracted and undiffracted beams, the two switching states can be obtained as shown in FIGS. 1a and 1b. The two optical beams exchange positions when they propagate through a compensating glass plate 24 (or air). FIG. 1(a) shows the exchanging state. AOD 12 is set "off" and does not diffract the incident beams, while AOD 14 is set "on" and diffracts the incident beams. Leakage noise from AOD 12 is essentially non-existent, as AOD 12 is not driven. Similarly, FIG. 1(b) shows the non-exchange state. AOD 12 is set "on" to diffract the incident beams, while AOD 14 is set "off". A reversal optical element 26 (e.g., dove prism) is used to exchange once more the position of the two beams with each other. Small levels of leakage noise from AOD 12 due to the non-perfect diffraction efficiency will pass via AOD 14 and be blocked by a spatial block or absorber 28. Hence, in both switching state cases of FIGS. 1a and 1b, leakage noise is essentially non-existent, and mainly due to scattering from the optical components. The lenses 30, 32 provide both focusing and imaging, which is required for appropriate switching fabric operation. An additional feature of the optical switch 10 is that it is fully reversible, i.e., the input and output ports can be interchanged. The output side as described includes identical elements to the input side, i.e., output fibers 16a, 18a and GRIN lenses 20a, 22a. The switching speed is dependent on the optical beam diameter incident on the AOD 12 or 14. The typical beam diameter from a GRIN -lens based FO-collimator is ~0.45 mm. Thus, the expected switching time is 100–200 ns.

Note that the two fiber lens collimators at the input and output ports of the switch structure can be simplified by using just one fiber collimator lens per port, where each fiber lens has two adjacent single mode fibers located around the central region of the solid lens structure. Hence, two signals that are fiber guided can be introduced and captured for output in the switch structure by using a single fiber lens for two fibers.

An additional feature of the illustrated 2×2 optical switch is that it has robust automated active beam alignment capabilities via analog frequency tuning capability of the AOD drive signals that allows for precision beam motion. Small beam or FO-collimator misalignments that affect the optical insertion loss of the switch 10 can be corrected by adjusting the RF frequency driving the AO devices. Small changes in the RE frequency can result in accurate beam motion of the optical beams in the switch structure to optimize coupling efficiency and add robustness to the design.

As described earlier, the 2×2 optical switch operates with the two AOD devices 12, 14 always in orthogonal states. This is very important for suppressing the leakage noise to the desired levels. Nevertheless, this has an effect on the optical carrier that gets a negative Doppler shift for both of its states. By changing the direction of the drive signals on the AO devices, it is possible to use only +1 order or positive doppler shift beams. Hence, a sister 2×2 switch 34 can be formed that always gives a positive doppler shift as shown in FIGS. 2a and 2b where the AODs 12, 14 are inverted. If an N×N switch matrix needs to be assembled using these AO 2×2 switches, then the two opposite doppler shift 2×2 modules should be cascaded to cancel the doppler effect every two stages of the larger N×N switch. This method works for even N. In any case, for an odd N, the net doppler shift to the light beam is from a single 2×2 switch and for a given AO drive frequency $f$=100 MHz, the optical wavelength shifts by 100 MHz or 0.0006 nm. For a typical 1319 nm source, this wavelength shift is infinitesimal, and this ultra-low optical carrier off-set effect on system performance is essentially non-existent.

Figure 3:
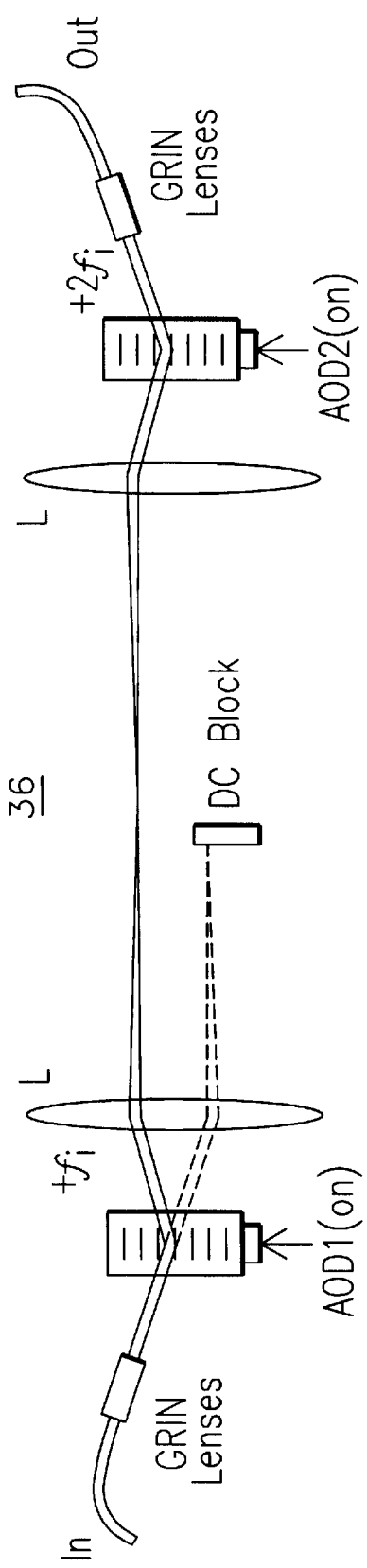
FIG. 3 illustrates a positive Doppler shift system for use in compensating negative shift in the switches of FIGS. 1 and 2.

Nevertheless, there is a way of canceling the Doppler shift using a dedicated module in the light flow path of the overall system to correct for this Doppler shift. If the negative Doppler shift switches are always one more than the positive Doppler shift switches in the network, the Doppler shift remaining at the output of the network is $-f$. Thus, a frequency shifter system 36 can be implemented using two AOD devices as shown in FIG. 3. The AODs 12, 14 are driven by $f_i=f/2$, and the optical beams obtain an additional $f$ Doppler shift that cancels the Doppler shift acquired from the optical switches. Note that unlike the switch structure, both AODs 12, 14 in the frequency shifter are simultaneously driven, resulting in no physical motion of the final output beam, a critical requirement for efficient fiber coupling. In other words, as the AOD drive frequency is changed, the output beam stays fixed on the fiber.

Note that by controlling the drive power in the AODs 12, 14, the double diffraction efficiency value can be accurately varied to result in a high resolution, high dynamic range FO attenuator. For example, if a single AOD has a 30 dB dynamic range for controlling its diffracted optical power, then the use of two such cascaded devices via the double diffraction process leads to a doubling in dynamic range to 60 dB for the final output light. This unique double diffraction design is a key innovation in making a high dynamic range, high resolution, variable FO attenuator.

Ideally, a FO attenuator should not act as a frequency shifter but only as a variable attenuator for the input light. The design in FIG. 3 can easily be modified by reversing the acoustic signal drive directions for one of the AODs 12, 14. This is done by flipping one of the AODs. This leads to a positive-negative or negative-positive doppler shift during the double diffraction process for the input optical beam, leading to cancellation of any doppler shift due to the AOD drive signals. Again, optical attenuation is controlled by varying the electrical drive power to the AODs that varies the single AOD diffraction efficiency, leading to a $^2$ light efficiency control due to double diffraction at the output of the module. Both AODs are fed simultaneously, as before. In dB(Decibels), the squaring operation in diffraction efficiency leads to a multiply by two in dB, as dBs are a logarithmic to the base 10 scale. This results in doubling of the dynamic range for the attenuator. Finally, the two AODs and the optics can also be arranged so that a change in AOD drive frequency from a predesigned set frequency physically moves the doubly diffracted beam with respect to the fiber output lens entrance, causing optical beam attenuation via miscoupling.

What is claimed is:

1. A 2×2 optical switch comprising:
   first and second optical input terminals for receiving respective optical signals and first and second optical output terminals for emitting selected ones of said optical signals;
   a first controllable optical deflector aligned in an optical path of said optical signals, said first deflector selectively directing each of said optical signals into one of a pair of different optical paths;
   path compensation optics arranged in alignment with said pair of different optical paths for directing said optical signals into one of another pair of optical paths; and
   a second controllable optical deflector aligned in said another pair of optical paths for selectively directing said optical signals into one of an optical absorber and said optical output terminals.

2. The optical switch of claim 1 wherein said path compensation optics comprises an optical element aligned in one of said pair of different optical paths for passing said optical signals in a straight path therethrough.

3. The optical switch of claim 1 wherein said path compensation optics comprises a reflective optical device for interexchanging said optical signals in another of said pair of different optical paths.

4. The optical switch of claim 3 wherein said optical device comprises a Dove prism.

5. The optical switch of claim 2 wherein said path compensation optics includes a Dove prism for interexchanging said optical signals in another of said pair of different optical paths.

6. The optical switch of claim 5 and including a first lens between said first deflector and said path compensation optics and a second lens between said path compensation optics and said second deflector.

7. The optical switch of claim 6 wherein said first deflector and said second deflector are conjointly oriented to effect a positive Doppler shift.

8. The optical switch of claim 1 wherein said first and second deflectors comprise acousto-optic deflectors.

9. The optical switch of claim 8 wherein at least one of said deflectors is acoustically energized to effect an off-center optical path so as to attenuate said optical signals.

10. The optical switch of claim 9 wherein said deflectors are operated in a Bragg diffraction mode.

11. The optical switch of claim 10 and including optically collimating lenses at said input and said output.

12. The optical switch of claim 11 wherein said collimating lenses comprise GRIN lenses.

13. The optical switch of claim 12 wherein said optical signals are directed to said input through optical fibers.

14. The optical switch of claim 13 wherein each optical fiber terminates in said input GRIN lens.

15. The optical switch of claim 14 wherein said optical fibers are closely positioned at said input GRIN lens such that each said optical signal is directed through a single common GRIN lens.

16. The optical switch of claim 1 and including an optical absorber at said switch output for absorbing optical signal leakage through said deflectors.

17. The optical switch of claim 6 and including a positive Doppler shift system connected to said output for compensating for induced negative Doppler shift of the optical signals, said system including another pair of serially aligned controllable optical deflectors positioned in the optical signal path and concurrently excited.

18. The optical switch of claim 17 wherein said another pair of optical deflectors comprise acousto-optical deflectors.

19. The optical switch of claim 18 and including collimating lenses in said system.

20. The optical switch of claim 19 and including detracting lenses between said serially aligned acousto-optical deflectors.

* * * * *